(12) United States Patent
Mueller

(10) Patent No.: US 12,074,521 B2
(45) Date of Patent: Aug. 27, 2024

(54) CIRCUIT ARRANGEMENT FOR BALANCING A SPLIT DC LINK

(71) Applicant: SMA Solar Technology AG, Niestetal (DE)

(72) Inventor: Burkard Mueller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 202 days.

(21) Appl. No.: 17/886,134

(22) Filed: Aug. 11, 2022

(65) Prior Publication Data

US 2022/0385188 A1 Dec. 1, 2022

Related U.S. Application Data

(63) Continuation of application No. PCT/EP2021/053570, filed on Feb. 13, 2021.

(30) Foreign Application Priority Data

Feb. 13, 2020 (DE) ...................... 10 2020 103 839.9

(51) Int. Cl.
*H02M 3/158* (2006.01)
*H02M 7/483* (2007.01)

(52) U.S. Cl.
CPC ......... *H02M 3/158* (2013.01); *H02M 7/4833* (2021.05)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS

| 10,541,623 | B1* | 1/2020 | Michal | ................. H02M 7/487 |
| 10,804,812 | B1* | 10/2020 | Dehem | ............ H02M 3/33571 |
| 10,833,594 | B2 | 11/2020 | Leong et al. | |
| 2006/0139977 | A1 | 6/2006 | Oicles et al. | |

(Continued)

FOREIGN PATENT DOCUMENTS

CN 205847105 U 12/2016
CN 208174548 U 11/2018
(Continued)

OTHER PUBLICATIONS

International Search Report dated Apr. 29, 2021 in connection with PCT/EP2021/053570.
(Continued)

*Primary Examiner* — Jeffrey A Gblende
(74) *Attorney, Agent, or Firm* — Eschweiler & Potashnik, LLC

(57) ABSTRACT

A circuit arrangement for balancing a split DC link arranged between a first DC-voltage terminal and a second DC-voltage terminal is disclosed. The first DC-voltage terminal is connected via a first semiconductor switch to a first intermediate point that is connected via a second semiconductor switch to a bridge center point that is connected via a third semiconductor switch to a second intermediate point that is connected via a fourth semiconductor switch to the second DC-voltage terminal. A first terminal of a resonant capacitor is connected to the first intermediate point, and a second terminal of the resonant capacitor is connected to a DC-link center point via a connecting path, in which a resonant inductor is arranged in a series circuit with the third semiconductor switch, and which runs via the second intermediate point. An additional winding is magnetically coupled to the resonant inductor and a first terminal thereof is connected via a first diode to a first terminal of a countervoltage source, and a second terminal thereof is connected to a second terminal of the countervoltage source (Continued)

so that an energy coupled into the additional winding from the resonant inductor is discharged into the countervoltage source.

20 Claims, 7 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491

See application file for complete search history.

(56) References Cited

U.S. PATENT DOCUMENTS

| | | |
|---|---|---|
| 2008/0211456 A1 | 9/2008 | Bolz et al. |
| 2015/0162840 A1 | 6/2015 | Frost et al. |
| 2018/0275699 A1 | 9/2018 | Oughton |
| 2018/0337610 A1* | 11/2018 | Leong ................ H02M 1/083 |

FOREIGN PATENT DOCUMENTS

| | | |
|---|---|---|
| DE | 102005014285 A1 | 10/2006 |
| DE | 102018112088 A1 | 11/2018 |

OTHER PUBLICATIONS

Abbasi Mehdi et al. "An improved voltage balancing technique for a soft-switched high-gain converter with low voltage stress using duty ratio control for wind energy application". Published Oct. 1, 2017, pp. 4136-4143.

Kenichiro Sano et al. "Voltage-Balancing Circuit Based on a Resonant Switched-Capacitor Converter for Multilevel Inverters" Published Nov. 1, 2008, pp. 1768-1776.

\* cited by examiner

CIRCUIT ARRANGEMENT FOR BALANCING A SPLIT DC LINK

CROSS REFERENCE TO RELATED APPLICATIONS

This application is a continuation of International Patent Application Number PCT/EP2021/053570, filed on Feb. 13, 2021, which claims priority to German Patent Application number 10 2020 103 839.9, filed on Feb. 13, 2020, and is hereby incorporated by reference in its entirety.

FIELD

The disclosure relates to a circuit arrangement for balancing a split DC link.

BACKGROUND

Multilevel inverters generally have a split DC link, which comprises a series circuit comprising a first DC-link capacitor and a second DC-link capacitor between a first DC-voltage terminal and a second DC-voltage terminal, and has a DC-link center point between the two DC-link capacitors.

During operation of such a multilevel inverter for forming an island grid, said multilevel inverter needs to be suitable for connecting to any of various desired loads. Problematic here are consumers which draw different powers depending on the polarity of the voltage, such as, for example, blowers, whose heating coil is operated via a diode, or greater loads which are connected by means of center-point rectifiers. Upon connection of such loads to a multilevel inverter having a split DC link, without any further measures the electrical potential at the DC-link center point would shift in the direction of the potential at one of the DC-voltage terminals and thus cause overvoltages at one DC-link half and the semiconductor switches connected thereto.

Therefore, circuits are known for balancing split DC links which, in the event of nonuniform voltage division among the two DC-link halves, effect charge balancing between the DC-link capacitors so that the potential of the DC-link center point is shifted in the direction of a potential which is in the center between the potentials at the two DC-voltage terminals.

The document K. Sano and H. Fujita, "Voltage-Balancing Circuit Based on a Resonant Switched-Capacitor Converter for Multilevel Inverters" in IEEE Transactions on Industry Applications, vol. 44, no. 6, pp. 1768-1776, November-December 2008, discloses, for example in the discussion of the prior art, the use of a bidirectional resonant switched capacitor converter (RSCC) for balancing a split DC link. In this case, a series circuit comprising a first and a second semiconductor switch, which each have antiparallel diodes, is arranged in parallel with the first DC-link capacitor, and a series circuit comprising a third and a fourth semiconductor switch, which each have antiparallel diodes, is arranged in parallel with the second DC-link capacitor. A first intermediate point between the first and the second semiconductor switch is connected, via a series circuit comprising a resonant capacitor and a resonant inductor, to a second intermediate point between the third and fourth semiconductor switches.

In addition to the balancing circuit described previously, in the discussion of the prior art in document WO 2016/011380 A1 a circuit is disclosed which differs from the previously described balancing circuit in that the resonant inductor is not arranged between the resonant capacitor and the second intermediate point but between a point between the second and third semiconductor switches and the DC-link center point. The first intermediate point is in this case connected to the second intermediate point via the resonant capacitor.

Balancing of a split DC link can be performed using this circuit in the same way as using the previously described balancing circuit, wherein the driving of the semiconductor switches takes place in exactly the same way in both circuits.

Apart from an imbalance in the voltages across the split DC link which is caused by unbalanced loads, in the case of balanced loads a fluctuation over time in the instantaneous load of the DC-link halves occurs. In the case of a three-phase three-level inverter, for example, the instantaneous power of the DC-link halves fluctuates by approximately a third of the average power. Since this power fluctuation occurs in phase opposition for both DC-link halves, the DC-link halves are discharged nonuniformly and the potential at the DC-link center point fluctuates at three times the grid frequency. The resulting imbalance in the voltages across the split DC link is compensated for, however, when averaged over time, so that balancing is in this case superfluous and would only cause unnecessary losses.

In order to avoid such an unnecessary operation, it is conceivable to activate a balancing circuit only in the case of a relatively severe imbalance, i.e., only when the voltage difference between the DC-link halves is above a preset threshold value. In the case of inverters which are dimensioned for operation on a high voltage at the DC link, the potential fluctuations at the DC-link center point can nevertheless assume high values, for example more than ±10 V, so that, on activation of a balancing circuit of the type described previously, the resonant current would resonate very quickly owing to the high differential voltage only above a correspondingly high threshold value, as a result of which there is a risk of destruction of the semiconductor switches. Furthermore, the voltage across the resonant capacitor Cres can soar to such high values that, in the case of a circuit design in accordance with WO 2016/011380 A1, in which this voltage is temporarily present at a switch T2 or T3, this switch is destroyed.

SUMMARY

The present disclosure is directed to a circuit arrangement for balancing a split DC link that is suitable for compensating for imbalances in the voltages across the DC-link halves of the split DC link without in the process dangerously high currents or voltages occurring which lead to destruction of semiconductor switches.

In the case of a circuit arrangement according to one embodiment of the disclosure for balancing a split DC link, which comprises a series circuit comprising a first DC-link capacitor and a second DC-link capacitor between a first DC-voltage terminal and a second DC-voltage terminal and has a DC-link center point between the first DC-link capacitor and the second DC-link capacitor, the first DC-voltage terminal is connected via a first semiconductor switch to a first intermediate point, the first intermediate point is connected via a second semiconductor switch to a bridge center point, the bridge center point is connected via a third semiconductor switch to a second intermediate point, and the second intermediate point is connected via a fourth semiconductor switch to the second DC-voltage terminal. The semiconductor switches each have an antiparallel diode. Furthermore, a first terminal of a resonant capacitor is connected to the first intermediate point, and a second terminal of the resonant capacitor is connected to the DC-link center point via a connecting path, in which a resonant inductor is arranged in a series circuit with the third semiconductor switch, and which runs via the second intermediate point. The resonant capacitor and the resonant inductor therefore form a resonant circuit or are at least interconnected therefor by closing of the second or third semiconductor switch.

In the circuit arrangement according to the disclosure, an additional winding is magnetically coupled to the resonant inductor, wherein a first terminal of the additional winding is connected via a first diode to a first terminal of a countervoltage source. A second terminal of the additional winding is connected to a second terminal of the countervoltage source in such a way that an energy coupled into the additional winding from the resonant inductor is discharged into the countervoltage source via the first diode. The polarity of the first diode in relation to the first terminal of the additional winding and the first terminal of the countervoltage source in this case inherently results from the feature that the energy coupled into the additional winding is discharged into the countervoltage source via the first diode. In this case, discharge takes place only as long as the voltage across the additional winding is greater than a countervoltage present owing to the countervoltage source plus the forward voltage of the first diode, i.e., not all of the energy of the resonant circuit formed from the resonant capacitor and the resonant inductor is coupled into the additional winding and therefore fed into the countervoltage source, but only part of it.

In one embodiment of the circuit arrangement according to the disclosure, the second terminal of the additional winding is connected directly to the second terminal of the countervoltage source, wherein then, in yet a further embodiment, the first terminal of the additional winding is connected via a second diode to a third terminal of the countervoltage source. In this arrangement, the energy coupled into the additional winding from the resonant inductor is discharged via the first diode into the part of the countervoltage source between the first terminal and the second terminal or via the second diode into the part of the countervoltage source between the second terminal and the third terminal, depending on the polarity of the voltage across the additional winding. The polarity of the second diode in relation to the first terminal of the additional winding and the third terminal of the countervoltage source should be selected such that the energy coupled into the additional winding is discharged into the countervoltage source via the second diode.

In another embodiment of the circuit arrangement according to the disclosure, the second terminal of the additional winding is not connected directly to the second terminal of the countervoltage source but via a fourth diode. Furthermore, the first terminal of the additional winding is connected via a second diode to the second terminal of the countervoltage source, and the second terminal of the additional winding is connected via a third diode to the first terminal of the countervoltage source. The polarity of the second diode, the third diode and the fourth diode in relation to the first or second terminal of the additional winding and the first or second terminal of the countervoltage source may be selected so that the energy coupled into the additional winding is discharged into the countervoltage source via the diodes.

In the case of this embodiment, depending on the polarity of the voltage across the additional winding, the electrical potential present at the first terminal of the countervoltage source or the electrical potential present at the second terminal of the countervoltage source is then present at the second terminal of the additional winding, in each case only shifted through a forward voltage of the third or fourth diode, respectively, so that the energy coupled into the additional winding from the resonant inductor is discharged into the countervoltage source via the first and fourth diodes or via the second and third diodes, depending on the polarity of the voltage across the additional winding.

Resonating of the resonant current is prevented in the circuit arrangement according to one embodiment of the disclosure by virtue of the fact that the voltage driving the current in the resonant circuit formed from the resonant capacitor and the resonant inductor is limited by the fact that this voltage is transformed via the magnetic coupling onto the additional winding where it, depending on the embodiment, is clamped via the first or second diode or via the first and fourth diode or via the second and third diode to a voltage present at the countervoltage source.

In one embodiment of the circuit arrangement according to the disclosure in which the second terminal of the additional winding is connected via a third diode to the first terminal of the countervoltage source and via a fourth diode to the second terminal of the countervoltage source, a switchable connection can optionally be provided between the second terminal of the additional winding and a terminal of the countervoltage source which is at an intermediate potential between the electrical potentials present at the first and second terminals of the countervoltage source. When the switchable connection is closed, the second terminal of the additional winding is then connected to the intermediate potential, and when the switchable connection is open, the second terminal of the additional winding is connected via the third diode to the electrical potential at the first terminal of the countervoltage source and via the fourth diode to the electrical potential at the second terminal of the countervoltage source. Consequently, the countervoltage to which the additional winding is clamped can be switched over, by means of the switchable connection, between half the voltage and the full voltage of the countervoltage source, as a result of which the balancing power can then be varied.

Further embodiments are conceivable in which the voltage value of the countervoltage source can be set and/or the effective countervoltage can be switched over between the voltage of the entire countervoltage source and the voltage of only part of the countervoltage source, so that the effective countervoltage, and therefore the balancing power, can be set.

In a circuit arrangement according to one embodiment of the disclosure, the countervoltage source can be formed by the first DC-link capacitor and/or the second DC-link capacitor. In this case, the first DC-voltage terminal then corresponds to the first terminal of the countervoltage source, and, depending on the embodiment, the DC-link center point corresponds to the second terminal of the countervoltage source and the second DC-voltage terminal corresponds to the third terminal of the countervoltage source or else the second DC-voltage terminal corresponds to the second terminal of the countervoltage source.

A first advantage of the formation of the countervoltage source from the DC-link capacitors of the DC link to be balanced is that no additional, separate countervoltage source is required. Furthermore, the energy withdrawn from the DC link during the balancing process via the additional winding is simultaneously at least partially fed back into the DC link again. Depending on the embodiment of the circuit arrangement according to the disclosure, in this case then even the energy withdrawn from the first DC-link capacitor is fed into the second DC-link capacitor, or vice versa, and thus additionally supports the balancing process.

In one embodiment of the circuit arrangement according to the disclosure, the resonant inductor is arranged between the second terminal of the resonant capacitor and the second intermediate point, i.e., the first intermediate point is connected via a series circuit comprising the resonant capacitor and the resonant inductor to the second intermediate point, and the bridge center point is connected directly to the DC-link center point.

In another embodiment of the circuit arrangement according to the disclosure, the resonant inductor is arranged between the DC-link center point and the bridge center point so that the first intermediate point in this case is connected to the second intermediate point directly via the resonant capacitor.

In the circuit arrangement according to the disclosure, the four semiconductor switches are arranged so that each have an identical forward direction and reverse direction for a current flow between the first DC-voltage terminal and the second DC-voltage terminal. Consequently, the diodes which are antiparallel of the four semiconductor switches between the first DC-voltage terminal and the second DC-voltage terminal also each have an identical forward direction and reverse direction, which is opposite to the respective forward direction and reverse direction of the associated semiconductor switch.

In the circuit arrangement according to one embodiment of the disclosure, the voltage to be limited is applied by a switching operation, i.e., suddenly, to the resonant inductor. In order to avoid high pulsed currents in the windings of the resonant inductor and the additional winding, the magnetic coupling between the two windings should therefore not be too good. Advantageously, the coupling coefficient between the resonant inductor and the additional winding can be, for example, in the value range of from 0.8 to 0.9.

In one embodiment, the circuit arrangement according to the disclosure comprises a drive circuit for driving the semiconductor switches, wherein the drive circuit is configured to drive the first semiconductor switch and the third semiconductor switch using a first PWM signal (pulse-width-modulated signal) and to drive the second semiconductor switch and the fourth semiconductor switch using a second PWM signal, which, apart from dead times which need to be taken into consideration during switch-on and switch-off operations, is complementary to the first PWM signal. The pulse duration of the PWM signals is in this embodiment selected to be, for example, equal to half the period of a resonant oscillation of the resonant circuit formed from the resonant capacitor and the resonant inductor. A dead time between a switch-off of the first PWM signal and a switch-on of the second PWM signal, or vice versa, is, for example, as small as the semiconductor switches used allow. Therefore, PWM signals result whose frequency is below the resonant frequency of the resonant circuit formed from the series circuit comprising the resonant capacitor and the resonant inductor and which generally have a duty factor close to 50%.

During driving of the semiconductor switches by the drive circuit using such a first and second PWM signal, in the circuit arrangement according to one embodiment of the disclosure balancing of the split DC link takes place, during which the direction of energy flow is automatically set depending on the present imbalance in the voltages across the DC-link halves.

In a further embodiment of the circuit arrangement according to the disclosure, the drive circuit is configured to enable the PWM signals for the first semiconductor switch and the second semiconductor switch via a first enable signal and the PWM signals for the third semiconductor switch and the fourth semiconductor switch via a second enable signal. Via the first and second enable signal, the circuit arrangement according to one embodiment of the disclosure can optionally be activated for transfer of charges from the first DC-link capacitor into the second DC-link capacitor, or vice versa.

In yet a further embodiment, the circuit arrangement according to the disclosure comprises a drive circuit for driving the semiconductor switches, wherein the drive circuit is configured to drive the first semiconductor switch and the fourth semiconductor switch using a first PWM signal and to drive the second semiconductor switch and the third semiconductor switch using a second PWM signal which, apart from dead times to be taken into consideration during switch-on and switch-off operations, is complementary to the first PWM signal, and wherein the drive circuit is configured to enable the PWM signals for the first semiconductor switch and the second semiconductor switch via a first enable signal and the PWM signals for the third semiconductor switch and the fourth semiconductor switch via a second enable signal.

Furthermore, a circuit arrangement according to one embodiment of the disclosure can also comprise a drive circuit for driving the semiconductor switches which is configured to drive the first semiconductor switch using a first PWM signal and the second semiconductor switch using a second PWM signal which, apart from dead times to be taken into consideration during switch-on and switch-off operations, is complementary to the first PWM signal, and to drive the third semiconductor switch using a third PWM signal and the fourth semiconductor switch using a fourth PWM signal which, apart from dead times to be taken into consideration during switch-on and switch-off operations, is complementary to the third PWM signal. In this embodiment, too, the drive circuit is configured to enable the PWM signals for the first semiconductor switch and the second semiconductor switch via a first enable signal and the PWM signals for the third semiconductor switch and the fourth semiconductor switch via a second enable signal.

A circuit arrangement according to the disclosure can therefore comprise a drive circuit for driving the semiconductor switches which is configured to drive the first semiconductor switch together with the third semiconductor switch and, in complementary fashion thereto, the second semiconductor switch together with the fourth semiconductor switch or in each case either exclusively the first semiconductor switch and, in complementary fashion thereto, the second semiconductor switch or exclusively the third semiconductor switch and, in complementary fashion thereto, the fourth semiconductor switch using a PWM signal. In one embodiment, a circuit arrangement according to the disclosure can accordingly also comprise a drive circuit for driving the semiconductor switches which is configured to rule out simultaneous driving of the first semiconductor switch and the fourth semiconductor switch using one and the same PWM signal and/or simultaneous driving of the second semiconductor switch and the third semiconductor switch using one and the same PWM signal.

The drive circuit can be configured, for example, to set the first enable signal when the difference between the voltage across the first DC-link capacitor and the voltage across the second DC-link capacitor exceeds a first threshold value and to reset it when the difference between the voltage across the first DC-link capacitor and the voltage across the second DC-link capacitor falls below a second threshold value. At the same time, the drive circuit can be configured to set the second enable signal when the difference between the voltage across the second DC-link capacitor and the voltage across the first DC-link capacitor exceeds the first threshold value and to reset it again when the difference between the voltage across the second DC-link capacitor and the voltage across the first DC-link capacitor falls below the second threshold value.

In one embodiment the first threshold value and the second threshold value are selected such that balancing is only activated when the difference in the voltages across the DC-link halves is greater than periodic fluctuations, which potentially also occur in the case of a balanced load, in the difference in the voltages across the DC-link halves.

In one embodiment, optionally the first threshold value can also be selected to be smaller and, once this smaller first threshold value has been exceeded, the duty factor of the PWM signals can initially be limited to a smaller value, for example 5%, in order to precharge the resonant capacitor. The full duty factor of approximately 50% is then set when a third threshold value is exceeded which is of the above-mentioned order of magnitude.

For the embodiment in which the drive circuit is configured to drive the first and third semiconductor switches using a first PWM signal and the second and fourth semiconductor switches using a second PWM signal, a common enable signal can also be used in place of two enable signals, which common enable signal is set when the absolute value of the difference between the voltage across the first DC-link capacitor and the voltage across the second DC-link capacitor exceeds a first threshold value and to reset it again when the absolute value of the difference between the voltage across the first DC-link capacitor and the voltage across the second DC-link capacitor falls below a second threshold value.

In accordance with a further embodiment of the circuit arrangement according to the disclosure, the drive circuit is configured to synchronize enabling of the PWM signals by the enable signals with edges of the PWM signals. It is thus possible to ensure that, given a corresponding selection of the pulse duration of the PWM signals, the semiconductor switches are driven, after enabling, in each case for a half period of a resonant oscillation of the resonant circuit formed from the resonant capacitor and the resonant inductor and not for a shorter duration.

BRIEF DESCRIPTION OF THE DRAWINGS

The disclosure will be explained in more detail below with reference to figures. The figures are used in this case to illustrate embodiments of the disclosure but do not restrict the disclosure to the features shown.

DETAILED DESCRIPTION

Figure 1:
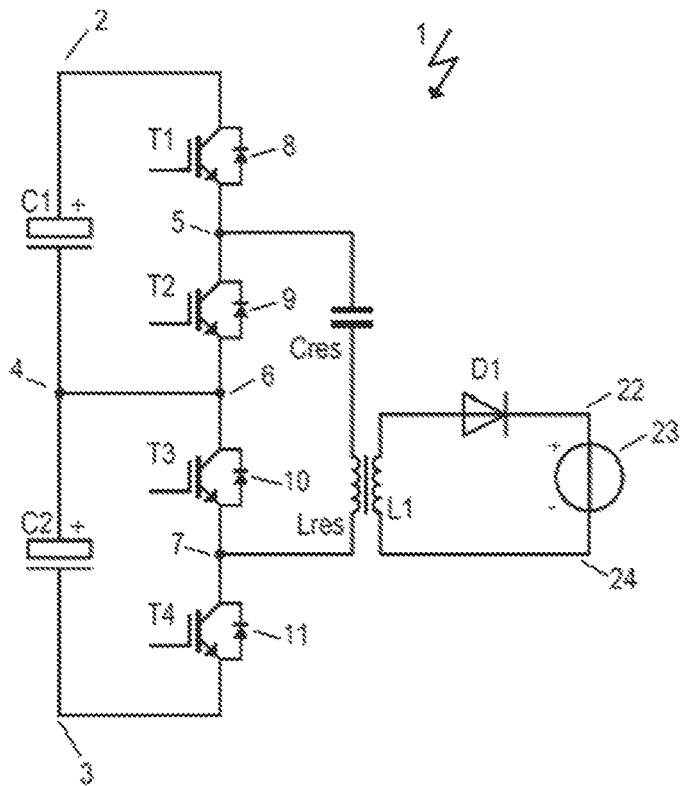
FIG. 1 shows a first embodiment of a circuit arrangement according to the disclosure.

FIG. 1 shows a circuit arrangement 1 according to the disclosure in which a split DC link is arranged between a first DC-voltage terminal 2 and a second DC-voltage terminal 3, said split DC link being formed from the series circuit comprising a first DC-link capacitor C1 and a second DC-link capacitor C2 with a DC-link center point 4.

A series circuit comprising a first semiconductor switch T1 and a second semiconductor switch T2 is connected in parallel with the first DC-link capacitor C1, and a series circuit comprising a third semiconductor switch T3 and a fourth semiconductor switch T4 is connected in parallel with the second DC-link capacitor C2. The four semiconductor switches T1, T2, T3, T4 in this case form a half-bridge between the first DC-voltage terminal 2 and the second DC-voltage terminal 3 with a bridge center point 6, which is connected directly to the DC-link center point 4.

In the circuit arrangement 1 in FIG. 1, the four semiconductor switches T1, T2, T3, T4 are arranged in such a way that they each have an identical forward direction and reverse direction for a current flow between the first DC-voltage terminal 2 and the second DC-voltage terminal 3 and each have an antiparallel diode 8, 9, 10, 11, whose forward direction and reverse direction are each opposite those of the associated semiconductor switch T1, T2, T3, T4.

A resonant circuit formed from the series circuit comprising a resonant capacitor Cres and a resonant inductor Lres is connected between a first intermediate point 5 between the first semiconductor switch T1 and the second semiconductor switch T2 and a second intermediate point 7 between the third semiconductor switch T3 and the fourth semiconductor switch T4. Furthermore, an additional winding L1 is magnetically coupled to the resonant inductor Lres, wherein a first terminal of the additional winding L1 is connected via a first diode D1 to a first terminal 22 of a countervoltage source 23, and a second terminal of the additional winding L1 is connected directly to a second terminal 24 of the countervoltage source 23.

In the embodiment of a circuit arrangement 1 according to the disclosure shown in FIG. 1, the energy coupled into the additional winding L1 from the resonant inductor Lres is discharged into the countervoltage source 23 via the first diode D1 given a corresponding polarity of the voltage across the additional winding L1. The winding sense of the resonant inductor Lres and the additional winding L1 on a common core can be selected as desired, i.e., both in the same direction or in the opposite direction, in this embodiment.

Figure 2:
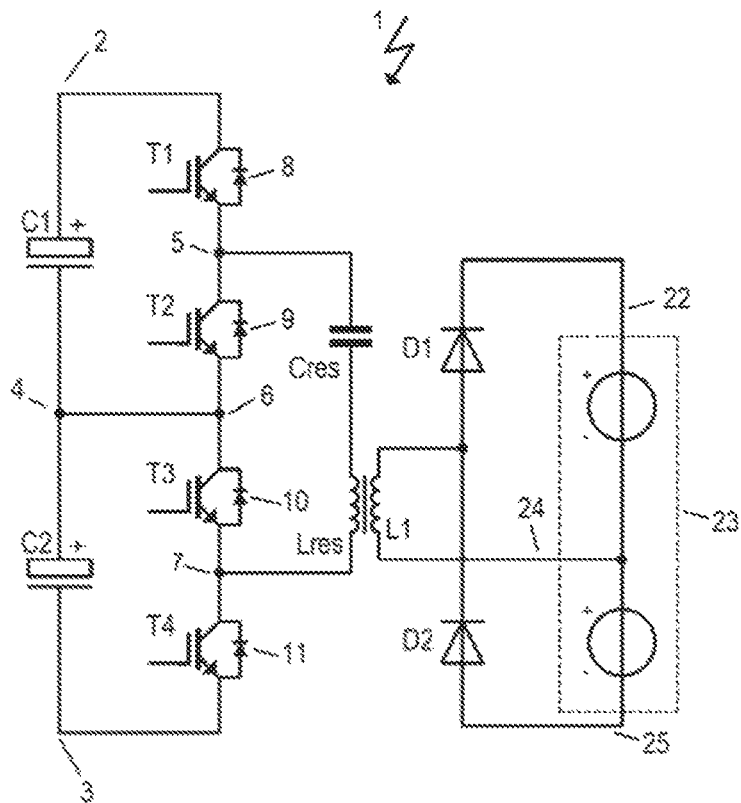
FIG. 2 shows a second embodiment of a circuit arrangement according to the disclosure.

In the embodiment of a circuit arrangement 1 according to the disclosure as illustrated in FIG. 2, in contrast to the embodiment in FIG. 1, the first terminal of the additional winding L1 is additionally connected via a second diode D2 to a third terminal 25 of the countervoltage source 23. The countervoltage source 23 is in this case in the form of a split countervoltage source, wherein the electrical potential at the second terminal 24 of the countervoltage source 23 forms an intermediate potential between the electrical potential at the first terminal 22 and the electrical potential at the third terminal 25 of the countervoltage source 23.

The energy coupled into the additional winding L1 from the resonant inductor Lres is in this embodiment discharged via the first diode D1 into the part of the countervoltage source 23 between the first terminal 22 and the second terminal 24 or via the second diode D2 into the part of the countervoltage source 23 between the second terminal 24 and the third terminal 25, depending on the polarity of the voltage across the additional winding L1. The winding sense of the resonant inductor Lres and the additional winding L1 on a common core can in this embodiment be selected as desired, i.e., both in the same direction or in the opposite direction.

Figure 3:
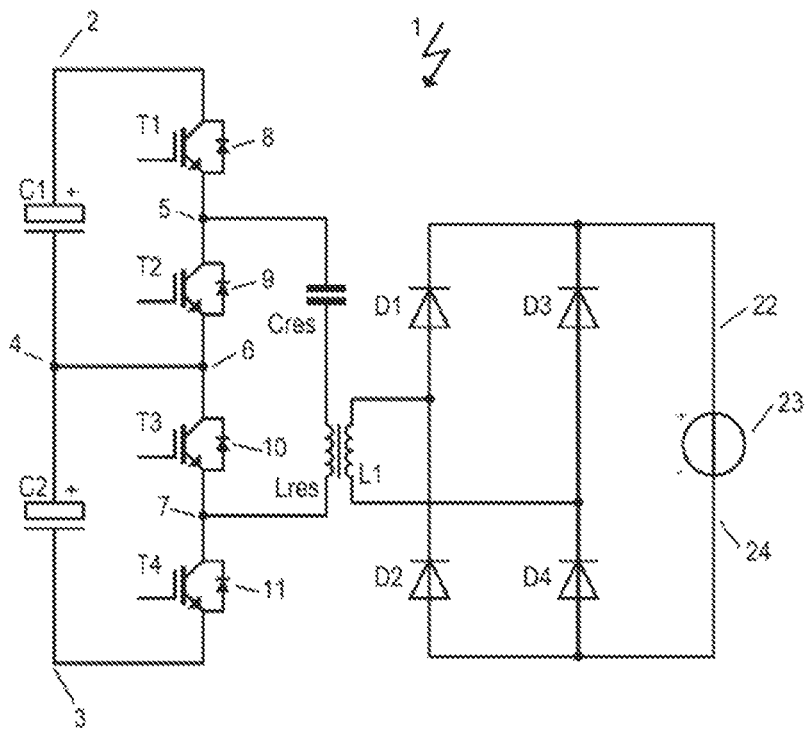
FIG. 3 shows a third embodiment of a circuit arrangement according to the disclosure.

In the embodiment of a circuit arrangement 1 according to the disclosure in FIG. 3, the second terminal of the additional winding L1 is connected via a third diode D3 to the first terminal 22 of the countervoltage source 23 and via a fourth diode D4 to the second terminal 24 of the countervoltage source 23. In this embodiment of a circuit arrangement 1 according to the disclosure, the energy coupled into the additional winding L1 from the resonant inductor Lres is discharged into the countervoltage source 23 either via the first diode D1 and the fourth diode D4 or via the second diode D2 and the third diode D3, depending on the polarity of the voltage across the additional winding L1. The winding sense of the resonant inductor Lres and the additional winding L1 on a common core can also be selected as desired, i.e., both in the same direction or in the opposite direction, in this embodiment.

Figure 4:
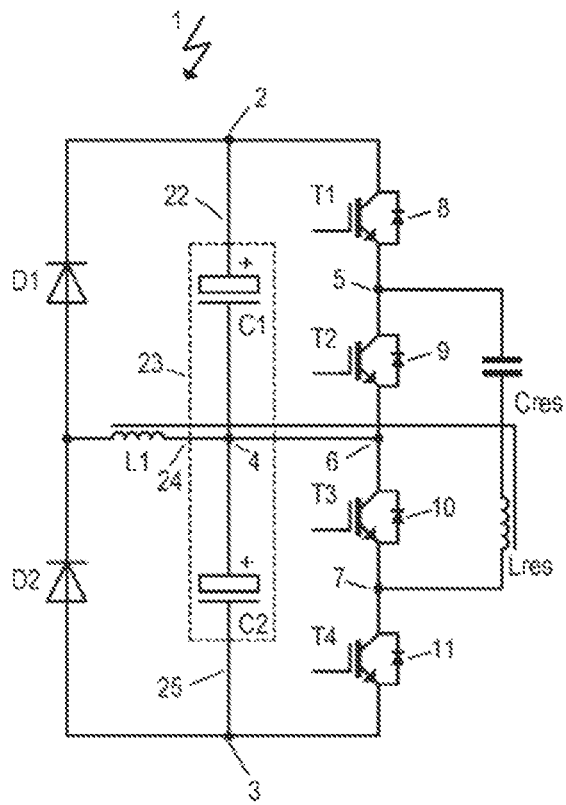
FIG. 4 shows a fourth embodiment of a circuit arrangement according to the disclosure.

FIG. 4 shows a circuit arrangement 1 according to the disclosure in which the countervoltage source 23 is formed by the split DC link arranged between the first DC-voltage terminal 2 and the second DC-voltage terminal 3. Correspondingly, in this case, in an arrangement similar to that in FIG. 2, the first terminal of the additional winding L1 is connected via a first diode D1 to the first DC-voltage terminal 2 and via a second diode D2 to the second DC-voltage terminal 3, and the second terminal of the additional winding L1 is connected directly to the DC-link center point 4.

In the embodiment of a circuit arrangement 1 according to the disclosure shown in FIG. 4, the energy coupled into the additional winding L1 from the resonant inductor Lres is discharged alternately via the first diode D1 into the first DC-link capacitor C1 of the DC link and via the second diode D2 into the second DC-link capacitor C2 of the DC link, i.e., alternately into one of the DC-link halves. The winding sense of the resonant inductor Lres and the additional winding L1 on a common core can be selected as desired, i.e., both in the same direction or in the opposite direction, similarly to the embodiment in FIG. 2.

Figure 5:
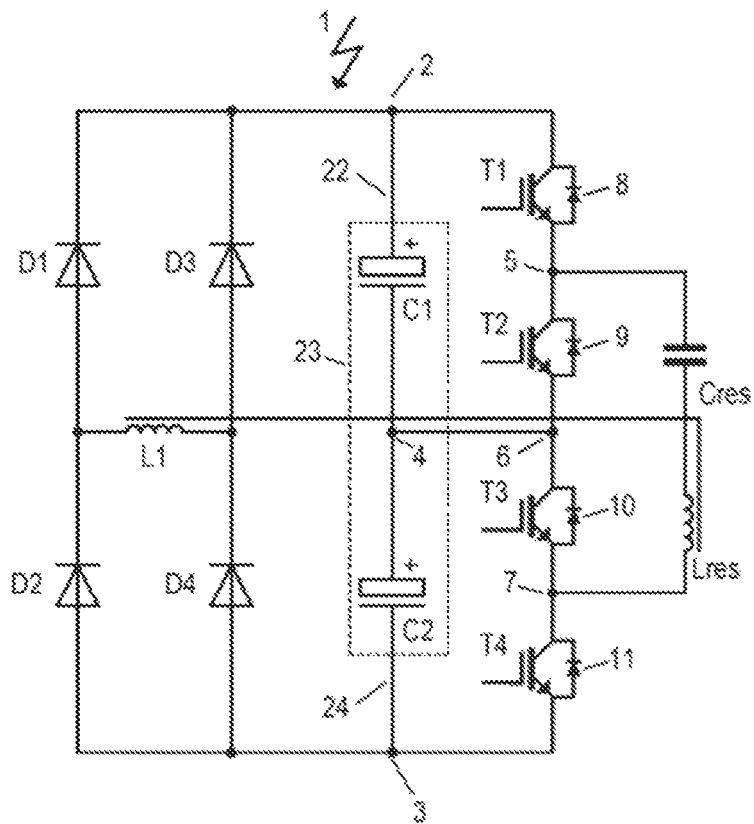
FIG. 5 shows a fifth embodiment of a circuit arrangement according to the disclosure.

The embodiment of a circuit arrangement 1 according to the disclosure illustrated in FIG. 5 differs from that in FIG. 4 in that the second terminal of the additional winding L1 is not connected to the DC-link center point 4 but, in a manner similar to the embodiment in FIG. 3, via a third diode D3 to the first DC-voltage terminal 2 and via a fourth diode D4 to the second DC-voltage terminal 3. In this embodiment of a circuit arrangement 1 according to the disclosure, the energy coupled into the additional winding L1 from the resonant inductor Lres is discharged either via the first diode D1 and the fourth diode D4 or via the second diode D2 and the third diode D3 into the DC link formed from the series circuit comprising the first DC-link capacitor C1 and the second DC-link capacitor C2, i.e., always into both DC-link halves independently of the polarity of the voltage across the additional winding. The winding sense of the resonant inductor Lres and the coil L1 on a common core can be selected as desired, i.e., both in the same direction or in the opposite direction, similarly to the embodiment in FIG. 3.

Figure 6:
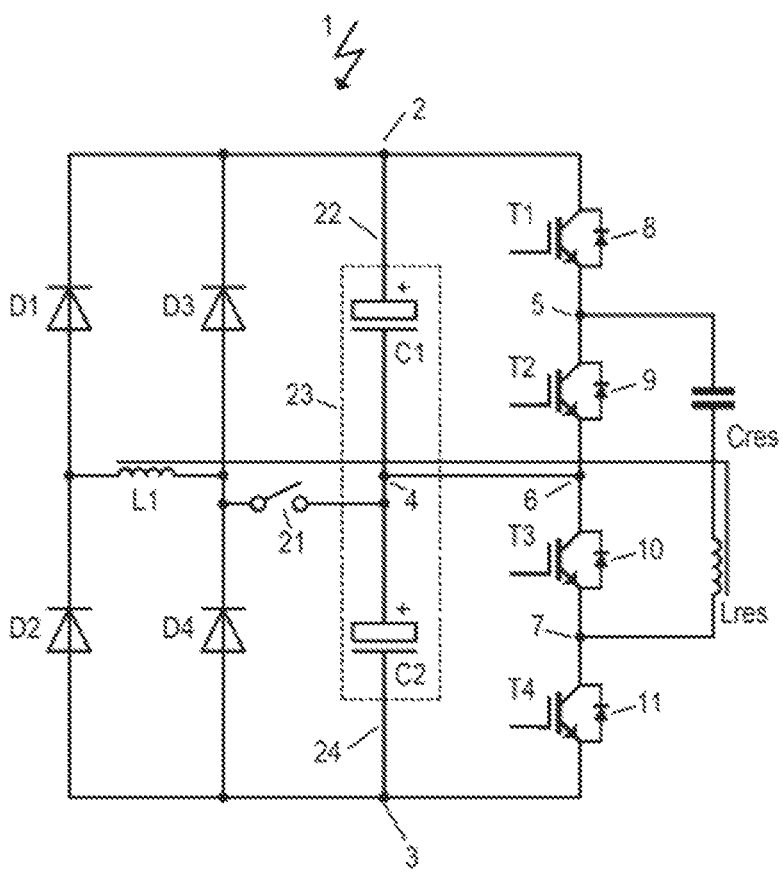
FIG. 6 shows a sixth embodiment of a circuit arrangement according to the disclosure.

In the embodiment of a circuit arrangement 1 according to the disclosure shown in FIG. 6, in comparison with the embodiment in FIG. 5, a switchable connection 21 is arranged between the second terminal of the additional winding L1 and the DC-link center point 4. When the switchable connection 21 is closed, the second terminal of the additional winding L1 is then connected to the DC-link center point 4, and when the switchable connection 21 is open, the second terminal of the additional winding L1 is connected via the third diode D3 to the first DC-voltage terminal 2 and via the fourth diode D4 to the second DC-voltage terminal 3. As a result, the energy coupled into the additional winding L1 from the resonant inductor Lres, when the switchable connection 21 is closed is discharged alternately into one of the DC-link halves, as in the example embodiment in FIG. 5, and, when the switchable connection 21 is open, is always discharged into both DC-link halves, as in the example embodiment in FIG. 6. The winding sense of the resonant inductor Lres and the additional winding L1 on a common core can correspondingly also be selected as desired, i.e., both in the same direction and in the opposite direction, in this embodiment.

Figure 7:
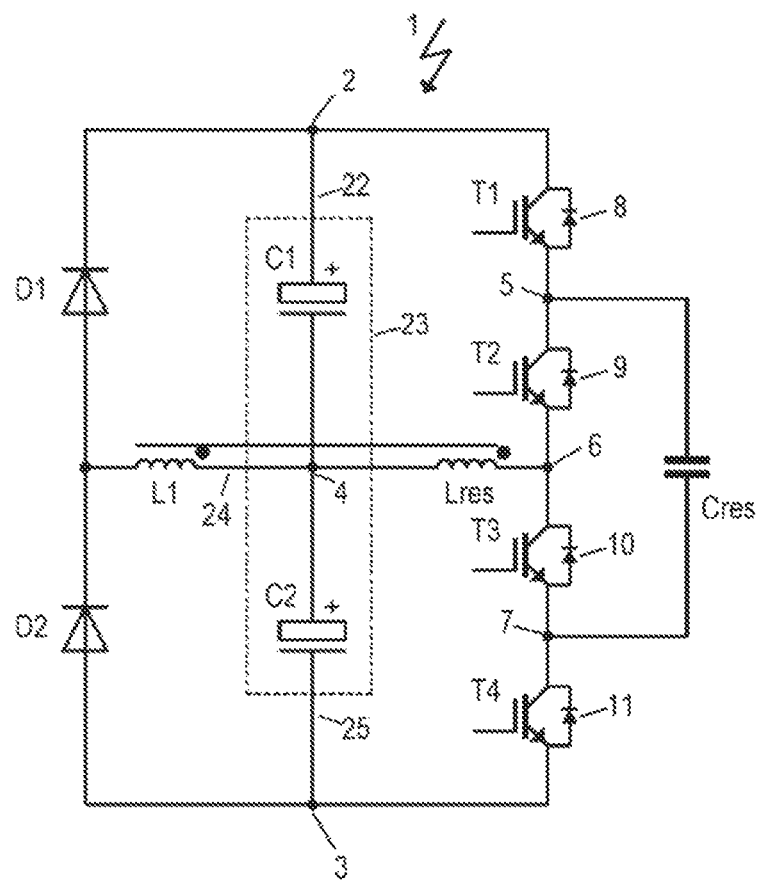
FIG. 7 shows a seventh embodiment of a circuit arrangement according to the disclosure.

FIG. 7 shows an embodiment of a circuit arrangement 1 according to the disclosure in which, in comparison with the embodiment in FIG. 4, the resonant inductor Lres is connected between the DC-link center point 4 and the bridge center point 6. In this case, only the resonant capacitor Cres is then connected between the first intermediate point 5 and the second intermediate point 7.

The winding sense of the resonant inductor Lres and the additional winding L1 on a common core is selected to be in the same direction in the case illustrated in FIG. 7. In connection with a winding sense selected in this way, an advantage of the embodiment in FIG. 7 in comparison with the embodiments in FIG. 4 and FIG. 5 results that the energy coupled into the additional winding L1 from the resonant inductor Lres is always discharged into that of the two DC-link capacitors C1 or C2 into which the energy from the resonant circuit formed from the resonant inductor Lres and the resonant capacitor Cres is also discharged, i.e., the discharge of the energy coupled into the additional winding L1 from the resonant inductor Lres in this case contributes additionally to the balancing of the DC link.

A further advantage of the embodiment shown in FIG. 7 with a winding sense of the resonant inductor Lres and the additional winding L1 as illustrated is that the arrangement comprising the additional winding L1 coupled to the resonant inductor Lres can be embodied as a component part with only three terminals.

In principle, an embodiment as in FIG. 7 with a winding sense of the resonant inductor Lres and the additional winding L1 on a common core which is selected so as to be in the opposite direction as a deviation therefrom is of course also possible, in which case, however, the abovementioned advantages are no longer provided.

It is furthermore also possible, in the case of the arrangement of the resonant inductor Lres between the DC-link center point 4 and the bridge center point 6 as in FIG. 7, to connect the second terminal of the additional winding L1 as in FIG. 5 via a third diode D3 to the first DC-voltage terminal 2 and via a fourth diode D4 to the second DC-voltage terminal 3. In this case, in the same way as in the embodiment shown in FIG. 5, the energy coupled into the additional winding L1 would always discharge into both DC-link halves and would therefore no longer additionally contribute to the balancing of the DC link.

Figure 8:
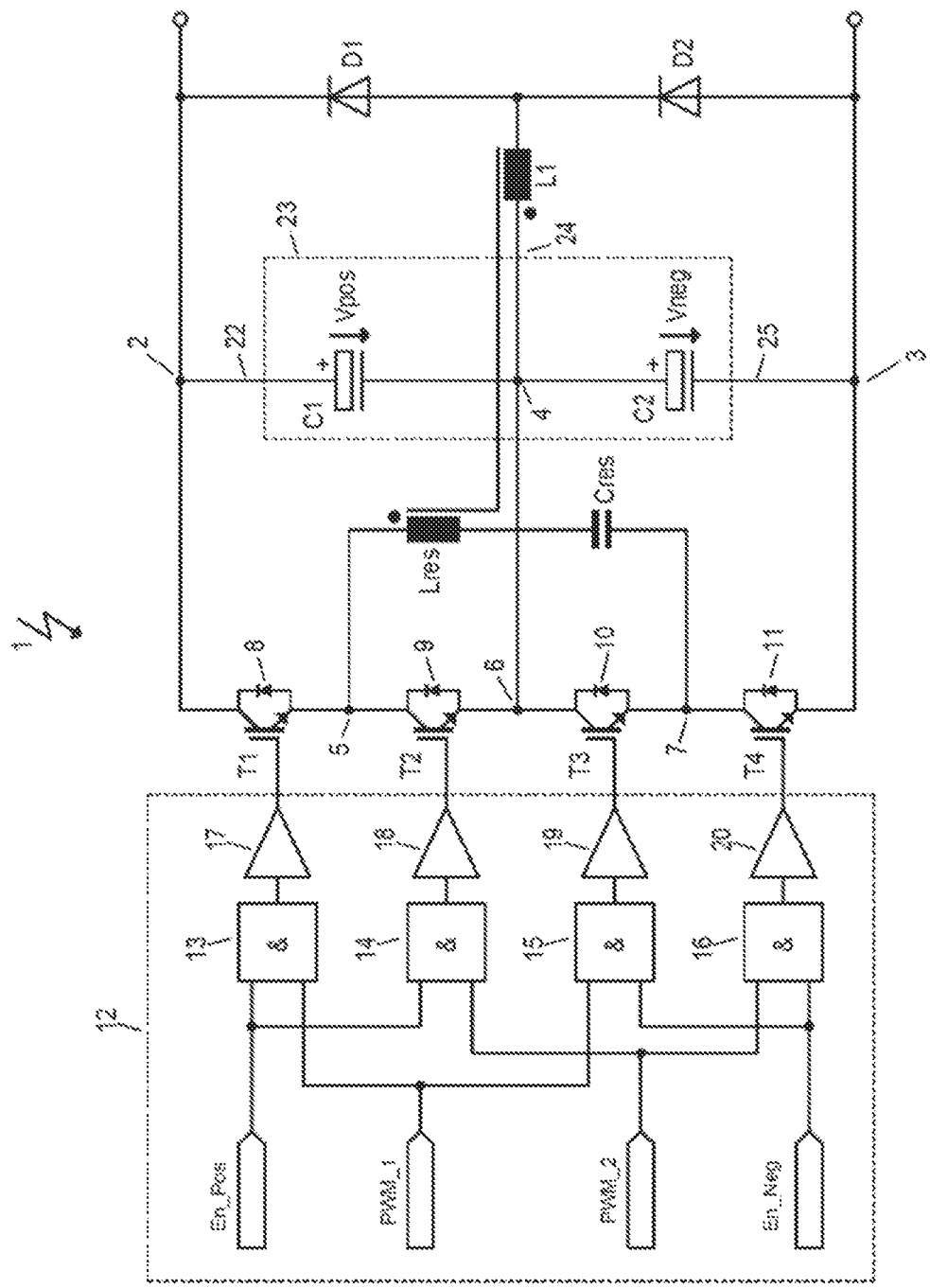
FIG. 8 shows an embodiment of a circuit arrangement according to the disclosure having a drive circuit for driving the semiconductor switches.

FIG. 8 shows an embodiment of a circuit arrangement 1 according to the disclosure having a drive circuit 12 for driving the semiconductor switches T1, T2, T3, T4.

A signal line for a first enable signal Enable_Pos is connected to a first input of a first AND gate 13 and to a first input of a second AND gate 14. A signal line for a second enable signal Enable_Neg is connected to a first input of a third AND gate 15 and to a first input of a fourth AND gate 16. Furthermore, a signal line for a first PWM signal PWM_1 is in each case connected to a second input of the first AND gate 13 and the third AND gate 16, and a signal line for a second PWM signal PWM_2 is in each case connected to a second input of the second AND gate 14 and the fourth AND gate 15. The outputs of the AND gates 13, 14, 15, 16 are each connected via drivers 17, 18, 19, 20 to drive inputs of the semiconductor switches T1, T2, T3, T4.

The drive circuit 12 in FIG. 8 is thus configured to enable or block the first PWM signal PWM_1 via the first enable signal Enable_Pos for driving the first transistor T1, to enable or block the second PWM signal PWM_2 via the first enable signal Enable_Pos for driving the second transistor T2, to enable or block the first PWM signal PWM_1 via the second enable signal Enable_Neg for driving the third transistor T3, and to enable or block the second PWM signal PWM_2 via the second enable signal Enable_Neg for driving the fourth transistor T4.

Figure 9:
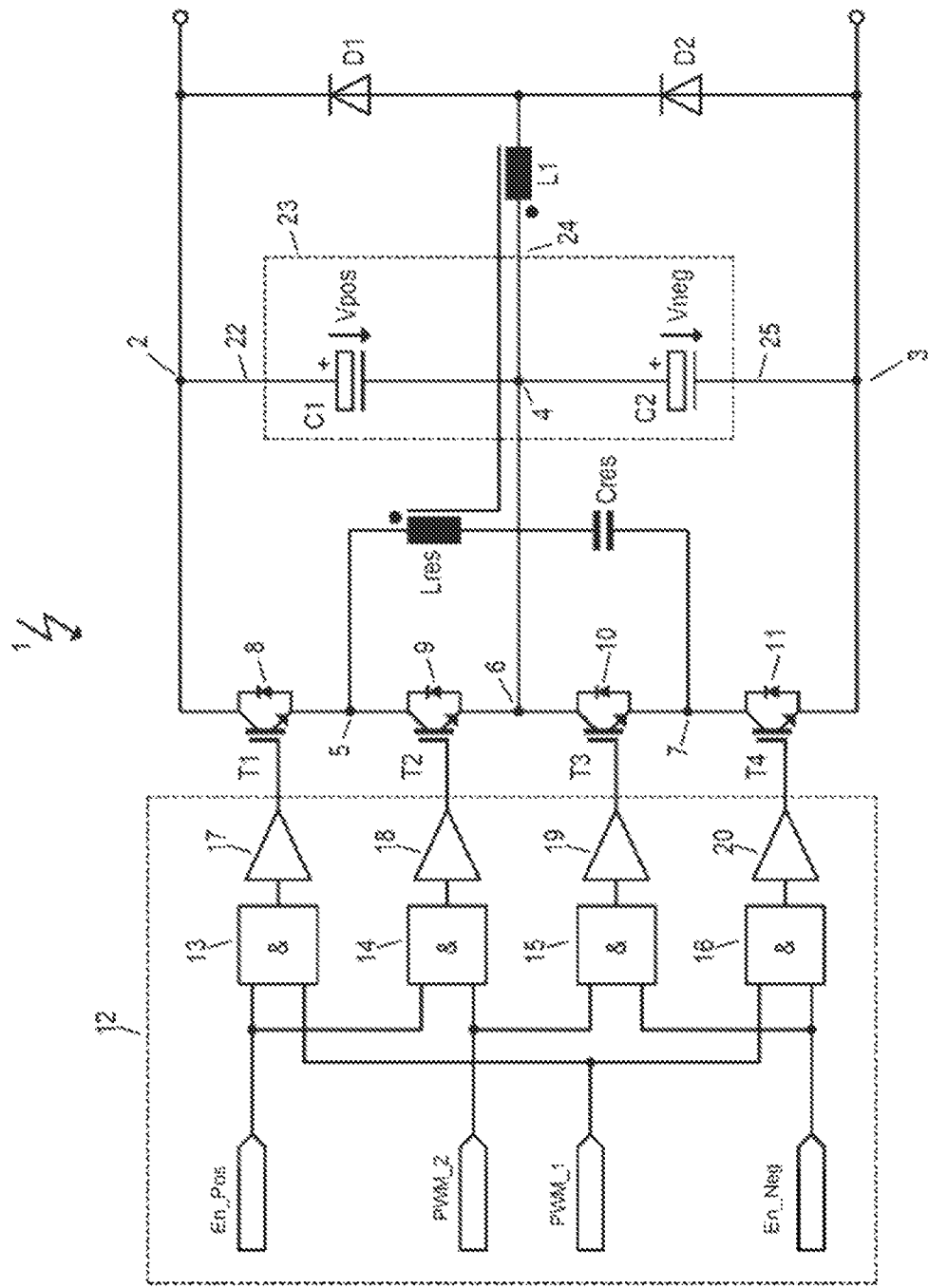
FIG. 9 shows yet a further embodiment of a circuit arrangement according to the disclosure having a drive circuit for driving the semiconductor switches.

The drive circuit 12 of the embodiment of a circuit arrangement 1 according to the disclosure in FIG. 9 differs from that in FIG. 8 in that a signal line for a first PWM signal PWM_1 is in each case connected to a second input of the first AND gate 13 and the fourth AND gate 16, and a signal line for a second PWM signal PWM_2 is in each case connected to a second input of the second AND gate 14 and the third AND gate 15.

The drive circuit 12 in FIG. 9 is thus configured to enable or block the first PWM signal PWM_1 via the first enable signal Enable_Pos for driving the first transistor T1, to enable or block the second PWM signal PWM_2 via the first enable signal Enable_Pos for driving the second transistor T2, to enable or block the second PWM signal PWM_2 via the second enable signal Enable_Neg for driving the third transistor T3, and to enable or block the first PWM signal PWM_1 via the second enable signal Enable_Neg for driving the fourth transistor T4.

Figure 10:
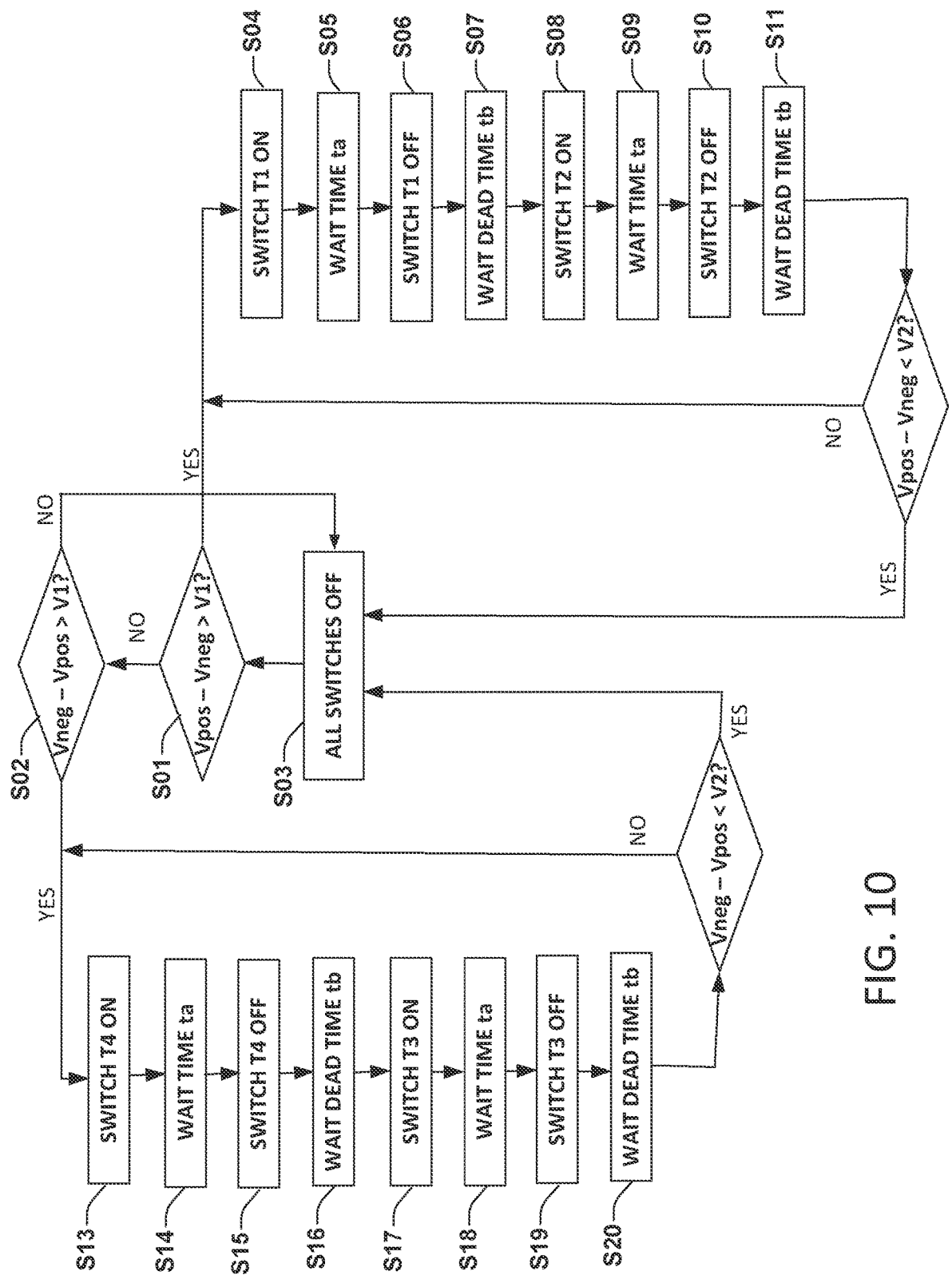
FIG. 10 shows a flowchart for the generation of signals for driving the semiconductor switches of a circuit arrangement according to the disclosure by means of a finite-state machine.

Instead of by means of interconnection of logic gates, as in the drive circuit 12 in FIGS. 8 and 9, suitable signals for driving the semiconductor switches T1, T2, T3, T4 can also be generated by means of a finite-state machine, for example using a microcontroller. A corresponding flowchart is illustrated in FIG. 10.

First, in a first act S01, a check is performed to ascertain whether a difference Vpos−Vneg between the voltage Vpos across the first DC-link capacitor C1 and the voltage Vneg across the second DC-link capacitor C2 exceeds a first threshold value V1. If not, in a second act S02, a check is performed to ascertain whether a difference Vneg−Vpos between the voltage Vneg across the second DC-link capacitor C2 and the voltage Vpos across the first DC-link capacitor C1 exceeds the first threshold value V1. If this is also not the case, in a third act S03, all of the semiconductor switches T1, T2, T3, T4 are switched off and acts S01 and S02 are repeated.

If, in the check in act S01, the difference Vpos−Vneg exceeds the first threshold value V1, in a fourth act S04 the first semiconductor switch T1 is switched on, in a fifth act S05 a time period ta is waited, and then, in a sixth act S06, the first semiconductor switch T1 is switched off again. The time period ta corresponds in this case to, for example, half the period of a resonant oscillation of the resonant circuit formed from the resonant capacitor Cres and the resonant inductor Lres.

Then, in a seventh act S07, a dead time tb is waited or elapses before, in an eighth act S08, the second semiconductor switch T2 is switched on. The not negligible switching times of the semiconductor switches T1, T2, T3, T4 are taken into consideration by the dead time tb in order to ensure that the first semiconductor switch T1 and the second semiconductor switch T2 cannot be in the switched-on state simultaneously and then short-circuit the first DC-link capacitor C1. The dead time tb is selected, for example, to be as small as the semiconductor switches used allow it to be.

In a ninth act S09, in turn the time period ta is waited or elapses, then, in a tenth act S10, the second semiconductor switch T2 is switched off again and, in an eleventh act S11, again the dead time tb is waited or elapses in order to ensure that the first semiconductor switch T1 and the second semiconductor switch T2 cannot be in the switched-on state simultaneously.

In a twelfth act S12, a check is performed to ascertain whether the difference Vpos−Vneg falls below a second threshold value V2. If not, acts S04 to S12 are repeated. Otherwise, a branch to act S03 is taken, in which all of the semiconductor switches T1, T2, T3, T4 are switched off, and then acts S01 and S02 are run through again as described previously.

The second threshold value V2 is in this case selected to be smaller than the first threshold value V1 in order to effect hysteresis for the activation of the circuit arrangement 1 for balancing.

If, in the check in act S02, the difference Vneg-Vpos exceeds the first threshold value V1, in a thirteenth act S13 the fourth semiconductor switch T4 is switched on, in a fourteenth act S14 the time period ta is waited, and then, in a fifteenth act S15, the fourth semiconductor switch T4 is switched off again.

Then, in a sixteenth act S16, the dead time tb is waited or elapses before, in a seventeenth act S17, the third semiconductor switch T3 is switched on. In this case, the not negligible switching times of the semiconductor switches T1, T2, T3, T4 are taken into consideration by the dead time tb in order to ensure that the third semiconductor switch T3 and the fourth semiconductor switch T4 are not in the switched-on state simultaneously since otherwise they short-circuit the second DC-link capacitor C2.

In an eighteenth act S18, the time period to is again waited, and then, in a nineteenth act S19, the third semiconductor switch T3 is switched off again and, in a twentieth act S20, the dead time tb is again waited in order to ensure that the third semiconductor switch T3 and the fourth semiconductor switch T4 are not in the switched-on state simultaneously.

In a twenty-first act S21, a check is performed to ascertain whether the difference Vneg−Vpos falls below a second threshold value V2. If not, acts S13 to S21 are repeated. Otherwise, a branch to act S03 is taken, in which all of the semiconductor switches T1, T2, T3, T4 are switched off, and then acts S01 and S02 are repeated again as previously described.

In an alternative configuration (not illustrated) of a finite-state machine, in acts S01 and S12 in FIG. 10 the absolute value of the difference Vpos−Vneg can also be checked to ascertain whether it exceeds the first threshold value V1 or falls below the second threshold value V2. In such a configuration of the finite-state machine, acts S02, S21 and S13 to S20 are then dispensed with and, in acts S04 to S11 the semiconductor switch T3 is switched on or off at the same time as the semiconductor switch T1 and the semiconductor switch T4 is switched on or off at the same time as the semiconductor switch T2.

The disclosure is not restricted to the explicitly shown embodiments, but can be modified in a variety of ways, in particular combined with other embodiments shown or known to a person skilled in the art.

What is claimed is:

1. A circuit arrangement for balancing a split DC link, which comprises a series circuit comprising a first DC-link capacitor and a second DC-link capacitor between a first DC-voltage terminal and a second DC-voltage terminal and the series circuit comprising a DC-link center point between the first DC-link capacitor and the second DC-link capacitor, wherein the first DC-voltage terminal is further connected via a first semiconductor switch to a first intermediate point, the first intermediate point is connected via a second semiconductor switch to a bridge center point, the bridge center point is connected via a third semiconductor switch to a second intermediate point, and the second intermediate point is connected via a fourth semiconductor switch to the second DC-voltage terminal, wherein the first, second, third and fourth semiconductor switches together form a series circuit and each have an antiparallel diode connected thereto, and the circuit arrangement further comprises a resonant circuit comprising a resonant capacitor and a resonant inductor, wherein a first terminal of the resonant capacitor is connected to the first intermediate point, and a second terminal of the resonant capacitor is connected to the DC-link center point via a connecting path, in which the resonant inductor is arranged in a series circuit with the third semiconductor switch, and which runs via the second intermediate point, the circuit arrangement further comprising an additional winding magnetically coupled to the resonant inductor, wherein a first terminal of the additional winding is connected via a first diode to a first terminal of a countervoltage source, and a second terminal of the additional winding is connected to a second terminal of the countervoltage source, wherein an energy coupled into the additional winding from the resonant inductor is discharged into the countervoltage source via the first diode.

2. The circuit arrangement as claimed in claim 1, wherein the second terminal of the additional winding is connected directly to the second terminal of the countervoltage source.

3. The circuit arrangement as claimed in claim 2, wherein the first terminal of the additional winding is connected via a second diode to a third terminal of the countervoltage source.

4. The circuit arrangement as claimed in claim 1, wherein the first terminal of the additional winding is connected via a second diode to the second terminal of the countervoltage source, and the second terminal of the additional winding is connected via a third diode to the first terminal of the countervoltage source and via a fourth diode to the second terminal of the countervoltage source.

5. The circuit arrangement as claimed in claim 1, wherein the countervoltage source is formed by the first DC-link capacitor and/or the second DC-link capacitor.

6. The circuit arrangement as claimed in claim 1, wherein the resonant inductor is arranged between the second terminal of the resonant capacitor and the second intermediate point.

7. The circuit arrangement as claimed in claim 1, wherein the resonant inductor is arranged between the DC-link center point and the bridge center point.

8. The circuit arrangement as claimed in claim 1, wherein the first, second, third and fourth semiconductor switches are arranged so that they each have an identical forward direction and reverse direction for a current flow between the first DC-voltage terminal and the second DC-voltage terminal.

9. The circuit arrangement as claimed in claim 1, wherein a coupling coefficient between the resonant inductor and the additional winding is in a value range of from 0.8 to 0.9.

10. The circuit arrangement as claimed in claim 1, further comprising a drive circuit configured to drive the first, second, third and fourth semiconductor switches using PWM signals, wherein the drive circuit is configured to prevent simultaneous driving of the first semiconductor switch and the fourth semiconductor switch with identical PWM signals and/or simultaneous driving of the second semiconductor switch and the third semiconductor switch with identical PWM signals.

11. The circuit arrangement as claimed in claim 1, further comprising a drive circuit configured to drive the first, second, third and fourth semiconductor switches using PWM signals, wherein the drive circuit is configured to drive the first semiconductor switch together with the third semiconductor switch and, in complementary fashion thereto, the second semiconductor switch together with the fourth semiconductor switch.

12. The circuit arrangement as claimed in claim 1, further comprising a drive circuit configured to drive the first, second, third and fourth semiconductor switches using PWM signals, wherein the drive circuit is configured to drive in each case either exclusively the first semiconductor switch and, in complementary fashion thereto, the second semiconductor switch or exclusively the third semiconductor switch and, in complementary fashion thereto, the fourth semiconductor switch.

13. The circuit arrangement as claimed in claim 11, wherein the drive circuit is configured to drive the first semiconductor switch and the third semiconductor switch using a first PWM signal and to drive the second semiconductor switch and the fourth semiconductor switch using a second PWM signal, which is complementary to the first PWM signal.

14. The circuit arrangement as claimed in claim 13, wherein the drive circuit is configured to enable the first and second PWM signals for the first semiconductor switch and the second semiconductor switch via a first enable signal, and enable the first and second PWM signals for the third semiconductor switch and the fourth semiconductor switch via a second enable signal.

15. The circuit arrangement as claimed in claim 12, wherein the drive circuit is configured to drive the first semiconductor switch and the fourth semiconductor switch using a first PWM signal and to drive the second semiconductor switch and the third semiconductor switch using a second PWM signal, which is complementary to the first PWM signal, and wherein the drive circuit is configured to enable the first and second PWM signals for the first semiconductor switch and the second semiconductor switch via a first enable signal, and enable the first and second PWM signals for the third semiconductor switch and the fourth semiconductor switch via a second enable signal.

16. The circuit arrangement as claimed in claim 14, wherein the drive circuit is configured to set the first enable signal when a difference between a voltage across the first DC-link capacitor and a voltage across the second DC-link capacitor exceeds a first threshold value, and to reset the first enable signal when a difference between the voltage across the first DC-link capacitor and the voltage across the second DC-link capacitor falls below a second, different threshold value, and is additionally configured to set the second enable signal when a difference between the voltage across the second DC-link capacitor and the voltage across the first DC-link capacitor exceeds the first threshold value, and to reset the second enable signal when a difference between the voltage across the second DC-link capacitor and the voltage across the first DC-link capacitor falls below the second, different threshold value.

17. The circuit arrangement as claimed in claim 15, wherein the drive circuit is configured to set the first enable signal when a difference between a voltage across the first DC-link capacitor and a voltage across the second DC-link capacitor exceeds a first threshold value, and to reset the first enable signal when a difference between the voltage across the first DC-link capacitor and the voltage across the second DC-link capacitor falls below a second, different threshold value, and is additionally configured to set the second enable signal when a difference between the voltage across the second DC-link capacitor and the voltage across the first DC-link capacitor exceeds the first threshold value, and to reset the second enable signal when a difference between the voltage across the second DC-link capacitor and the voltage across the first DC-link capacitor falls below the second, different threshold value.

18. The circuit arrangement as claimed in claim 14, wherein the drive circuit is configured to synchronize an enabling of the first and second PWM signals by the first and second enable signals with edges of the first and second PWM signals.

19. The circuit arrangement as claimed in claim 15, wherein the drive circuit is configured to synchronize an enabling of the first and second PWM signals by the first and second enable signals with edges of the first and second PWM signals.

20. The circuit arrangement as claimed in claim 10, wherein a frequency of the PWM signals is below a resonant frequency of a resonant circuit formed from the series circuit comprising the resonant capacitor and the resonant inductor.

* * * * *